United States Patent [19]

Briet

[11] Patent Number: 5,054,818
[45] Date of Patent: Oct. 8, 1991

[54] JOINING AND CONNECTING BLOCK BETWEEN FLEXIBLE ELASTOMER MATERIAL DUCTS

[75] Inventor: Gilles Briet, Geugnon, France

[73] Assignee: Hutchinson, Paris, France

[21] Appl. No.: 429,982

[22] Filed: Nov. 1, 1989

[30] Foreign Application Priority Data

Nov. 9, 1988 [FR] France .................. 88 14658

[51] Int. Cl.⁵ .......................................... F16L 39/00
[52] U.S. Cl. ................................ 285/137.1; 285/150; 285/284
[58] Field of Search ............. 285/150, 284, 292, 137.1

[56] References Cited

U.S. PATENT DOCUMENTS

| | | | |
|---|---|---|---|
| 96,555 | 11/1869 | Dayton | 285/284 X |
| 1,810,434 | 6/1931 | Morse et al. | 285/284 X |
| 2,070,888 | 2/1937 | Eschenbrenner | 285/284 X |
| 3,570,534 | 3/1971 | Beavers . | |
| 3,736,955 | 6/1973 | Schlesser . | |

FOREIGN PATENT DOCUMENTS

| | | |
|---|---|---|
| 0277058 | 8/1988 | European Pat. Off. . |
| 2026489 | 6/1971 | Fed. Rep. of Germany . |
| 1775636 | 9/1971 | Fed. Rep. of Germany . |

Primary Examiner—Dave W. Arola
Attorney, Agent, or Firm—Bell, Seltzer, Park & Gibson

[57] ABSTRACT

The invention relates to the manufacture, by molding, of a joining and connecting block between main ducts made from elastomer material and branch ducts which are connected thereto. The block may be molded in a single piece in two mold parts assembled together along a joining surface in the form of a Z.

7 Claims, 2 Drawing Sheets

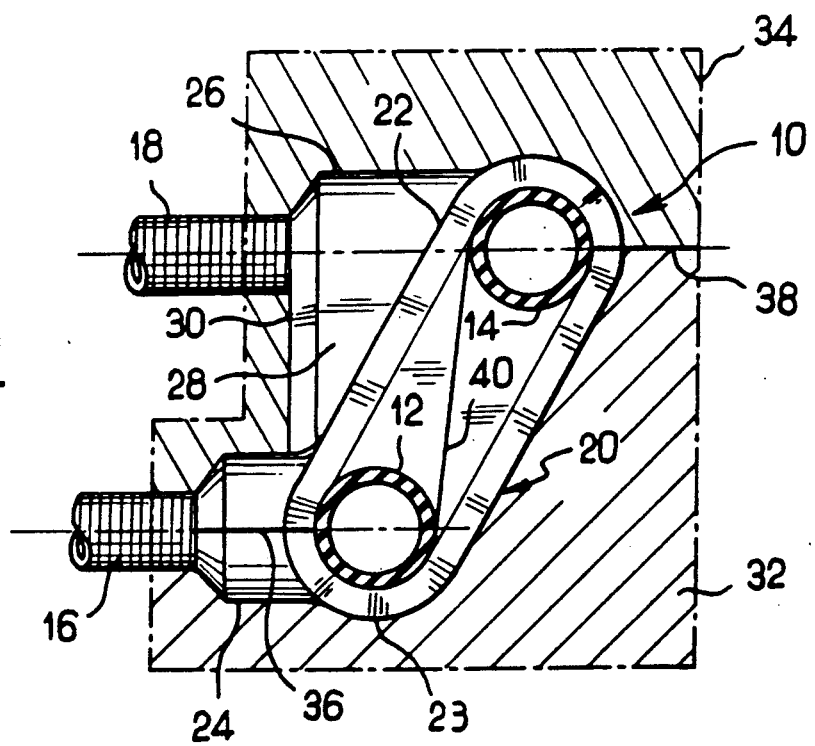
FIG_1
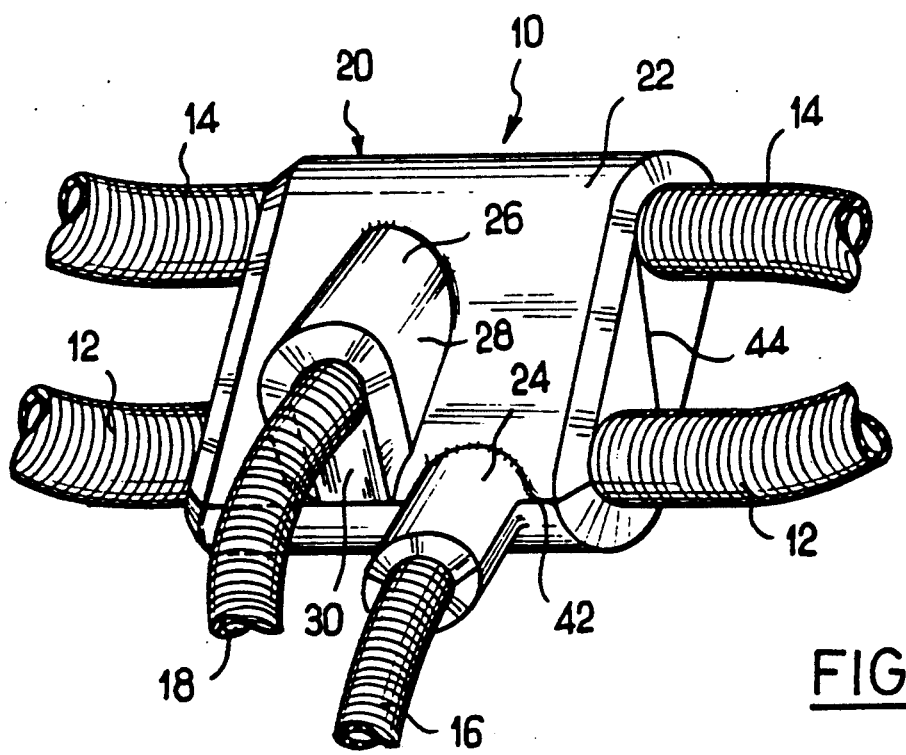
FIG_2

U.S. Patent   Oct. 8, 1991   Sheet 2 of 2   5,054,818
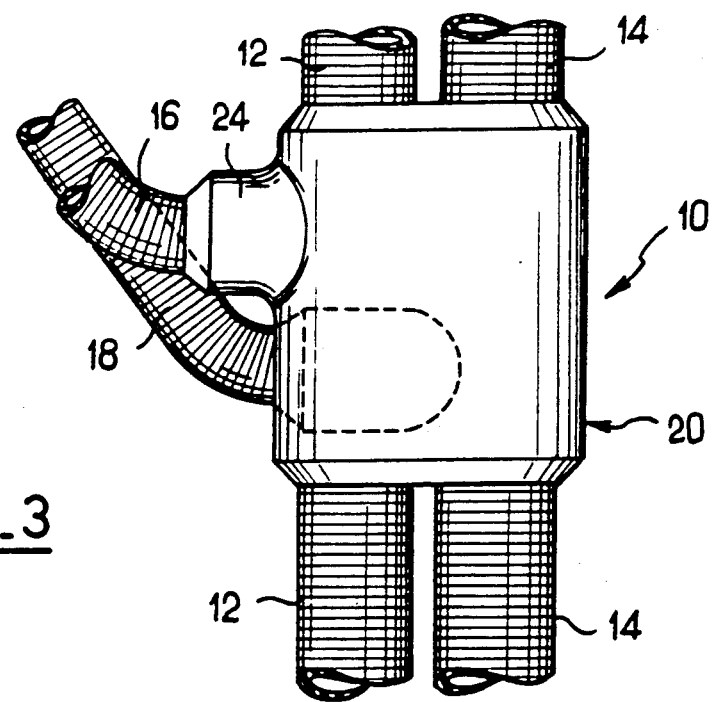
FIG_3
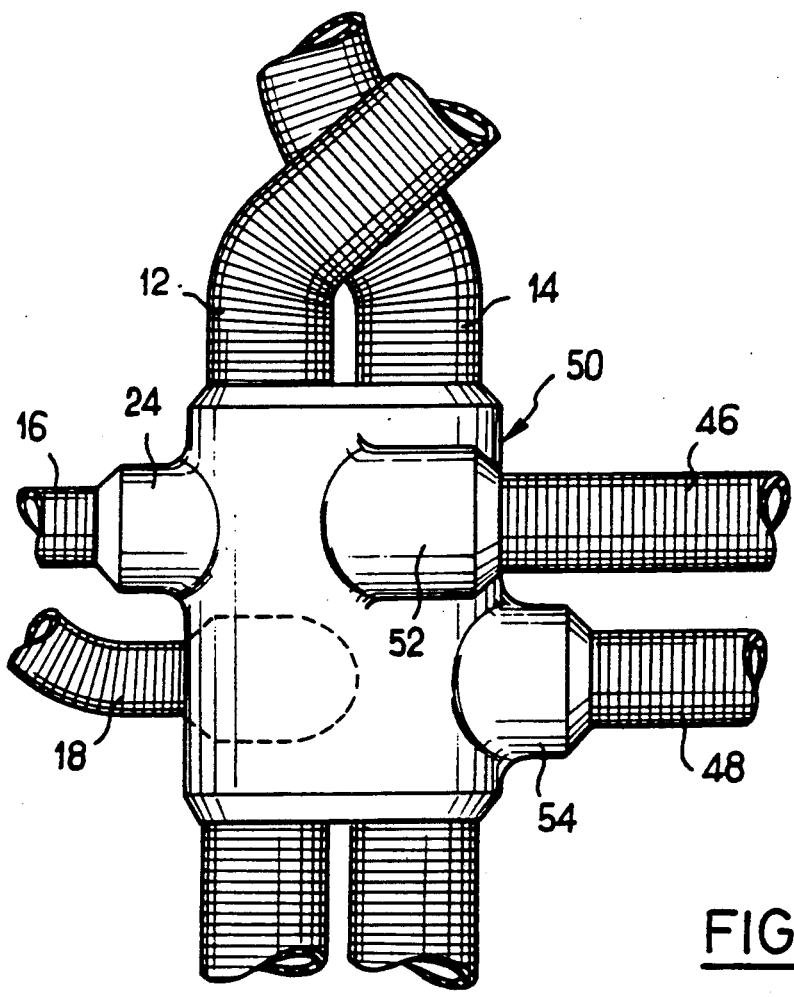
FIG_4

JOINING AND CONNECTING BLOCK BETWEEN FLEXIBLE ELASTOMER MATERIAL DUCTS

BACKGROUND OF THE INVENTION

The invention relates to a joining and connecting block between flexible ducts made from an elastomer material such as rubber, which comprise at least two main ducts and two branch ducts, each connected to a main duct. The invention also relates to a method and a device for manufacturing this joining and connecting block.

The flexible ducts which are used in the motor vehicle industry, in particular for forming fluid circuits such as cooling, heating and/or air-conditioning circuits are frequently provided with tappings, connections or branches for connecting a circuit to different members, or connecting several circuits together. The flexible ducts of these circuits follow paths which are often sinuous and must sometimes be assembled or joined together, both for facilitating handling of a set of ducts and for reducing the space occupancy and increasing the reliability of the circuits.

In known constructions of cooling, heating or airconditioning circuits for motor vehicles, each circuit is formed from a main duct to which one or more branch ducts are connected, then the main ducts may be assembled together by means of plastic material parts or else by molding elastomer over the parts of the main ducts which do not comprise the connections to the branch ducts. It is then necessary first of all to connect the different branch ducts one by one to the main duct, then assemble the main ducts together, which is relatively time consuming, so costly, and does not guarantee a relative and strict arrangement of the different ducts with respect to each other.

The purpose of the invention is in particular to overcome these drawbacks of the known technique.

SUMMARY OF THE INVENTION

For that it provides a joining and connecting block between flexible ducts made from an elastomer material such as rubber, comprising at least two main ducts and two branch ducts each connected to a main duct, characterized in that this block is made from an elastomer material molded in a single piece about the main ducts and their connections to the branch ducts and in that the main ducts being parallel in the joining zone, the axes of the branch duct connections are oriented obliquely with respect to the plane defined by the axes of the main ducts.

Because the joining and connecting block of the invention is molded in a single piece around the main ducts and their connections to the branch ducts, it is possible, in a single molding operation, to form not only the connections of the main ducts to the corresponding branch ducts but also the junction or mechanical connection between the two main ducts.

The fact that the axes of the branch ducts have a relative orientation determined with respect to the plane of the main ducts, it is possible precisely to achieve such molding in a simple and therefore inexpensive way.

According to another characteristic of the invention, the connection axes of the branch ducts, extending on the same side of the plane passing through the axes of the main ducts, are offset with respect to each other.

This relative arrangement of the branch ducts also facilitates molding of the block of the invention and removal thereof from the mold.

According to yet another characteristic of the invention, the axes of the branch ducts are parallel to each other (at least in their connecting zones to the main ducts).

This structural characteristic also facilitates manufacture of the block of the invention.

More precisely, the axis of at least one branch duct forms an angle greater than or equal to 90° with a plane tangential to the peripheries of the main ducts and extending from one side of a main duct to the opposite side of the other main duct, this plane corresponding to the trace of a joining surface between mold parts used for manufacturing said block.

As will be confirmed below, this arrangement also facilitates manufacture of the block, by making it possible to use a mold formed essentially in two parts.

In a variant, each main duct is connected to two branch ducts and the branch ducts connected to the same main duct are axially aligned.

The block also comprises elastomer material reinforcement sleeves which are molded around the connections of the branch ducts to the main ducts.

The invention also provides a method of joining and connecting between flexible ducts made from an elastomer material such as rubber, comprising at least two main ducts and two branch ducts each connected to a main duct, the method being characterized in that it consists in molding, in a single operation, a block of said elastomer material around said main ducts and their connections to the branch ducts, by injecting the elastomer material in a volume defined essentially by two mold parts joined together along a joining surface having a profile substantially in the form of a Z formed by a first joint plane defined by the axis of a main duct and the axis of the corresponding branch duct, a second joint plane defined by the axis of the other main duct and the axis of its branch duct and a third joint plane connecting the first two together and being tangential to the peripheries of the main ducts.

This manufacturing method makes it possible to form, in a single operation, the connections of the main ducts to their branch ducts and the joining or coupling of the main ducts to each other.

The method is also characterized in that it consists in molding, at the same time as said block, reinforcement sleeves around the ends of the branch ducts.

The invention also provides a device for manufacturing a joining and connecting block in accordance with the invention, characterized in that it comprises two mold parts defining therebetween a molding volume in the form of the block to be obtained and connected together along a joining surface having substantially a Z shape, formed by a first joint plane passing through the axis of a main duct and the axis of a branch duct which is connected thereto, a second joint plane passing through the other main duct and the axis of its branch duct and a third joint plane joining the first two together and being tangential to the peripheries of the main ducts.

Molding the block according to the invention and removal thereof from the mold, with this device, are simple and inexpensive to carry out.

BRIEF DESCRIPTION OF THE DRAWINGS

The invention will be better understood and other details, characteristics and advantages thereof will be clear from the following description, with reference to the accompanying drawings in which:

FIG. 1 is a schematic side view of the device of the invention;

FIG. 2 is a schematic perspective view of this device;

FIG. 3 is a top view of the device of FIG. 1; and

FIG. 4 is a view corresponding to FIG. 3, but showing a variant of the device of the invention.

DESCRIPTION OF THE PREFERRED EMBODIMENT

Referring first of all to FIGS. 1 to 3, which show schematically a joining and connecting device according to the invention between two main ducts 12 and 14 to each of which is connected a branch duct 16, 18 respectively.

Each duct 12, 14, 16, 18 is made from an elastomer material such as rubber and possibly comprises an internal textile reinforcement.

Block 10 is made from the same elastomer material as the ducts and comprises essentially a body 20 with two flat parallel faces joined together at their ends by two half cylinders with circular section. This body 20 has passing therethrough, parallel to its large flat faces, the main ducts 12, 14 and comprises, on one 22 of its flat faces, two projections 24 and 26 surrounding the ends of the branch ducts 16, 18 and connected to the main ducts 12, 14.

The projection 24 for connecting the branch duct 16 to the main duct 12 has the shape of a cylindrical sleeve 24 one end of which is attached to the flat face 22 of body 10 as well as to one of its semi-cylindrical edges 23, and the other end of which attached to the branch duct 16 has a truncated cone shape.

The other projection 26 has a substantially semicylindrical shape in the upper part and is extended downwards, in FIGS. 1 and 2, by flat parallel faces 28 having a substantially triangular external surface.

The front end face 30 of this projection, situated under the branch duct 18, is substantially flat.

In the embodiment shown, the axes of the branch ducts 16 and 18 are parallel to each other in their zones of connection to the main ducts 12, 14 and intersect the axes of these ducts, while being oriented substantially at right angles with respect to the latter. Furthermore, the plane passing through the axes of the main ducts 12, 14 is slanted through about 45°, in the example shown, with respect to the axes of the branch ducts 16, 18.

In addition, projections 24, 26 for connection to the branch ducts 16, 18 are offset transversely as can be clearly seen in FIG. 2, the axes of ducts 16, 18 not being located in the same plane perpendicular to the plane defined by the axes of the main ducts 12, 14.

This relative arrangement of the different ducts makes it possible to manufacture block 10 simply and rapidly by molding, as will be seen further on.

The device for manufacturing the block 10 of the invention comprises essentially two mold parts 32 and 34, whose contours have been shown with phantom lines in FIG. 1, which are joined together so as to define therebetween a volume having the shape of block 10 which has just been described, along a joining surface having substantially the shape of a Z comprising a first joint plane 36 passing through the axis of the main duct 12 and the axis of its branch duct 16, a second joint plane 38 passing through the axis of the main duct 14 and through the axis of its branch duct 18 and a third joint plane 40 which is tangential to the external surfaces of the main ducts 12 and 14. More precisely, the first joint plane 36 passes diametrically through the housing of the main duct 12 whereas the second joint plane 38 passes diametrically through the housing of the other main duct 14, and the third joint plane 40 connects the first and second joint planes together at their ends.

In the embodiment shown in FIG. 1, the third joint plane 40 is thus substantially perpendicular to the first and second joint planes 36, 38. It is necessary, for removal from the mold, for the angle formed by the third joint plane 40 with the first joint plane 36 and with the second joint plane 38 to be greater than or equal to 90°.

The mold parts 32 and 34 of course comprise passage orifices for the main ducts 12, 14 and the branch ducts 16, 18. The connection properly speaking of each branch duct to its main duct is provided by conventional means, for example a tubular connecting piece on the end of which the branch duct is mounted and whose other end is fitted sealingly in an orifice of the main duct, or is in the shape of a T. These means are well known to a man skilled in the art and will not be described further.

To manufacture the block of the invention, the following is the procedure to follow:

the main ducts 12, 14 to which the branch ducts 16, 18 are connected are placed in their housings in one of the mold parts 32, 34 after which the other mold part is placed on the first one to close the mold. It is then sufficient to inject into the molding cavity an appropriate elastomer material (preferably the same as that forming the ducts) so as to obtain, after vulcanization or cross-linking of the elastomer material, a block 10 which seals and holds in position the connections between the main ducts and the branch ducts and which also provides the connection or coupling of the two main ducts 12, 14. Removal from the mold is simple to achieve, by separating the mold parts 32, 34 by a translational movement in a direction perpendicular to the axes of the main ducts and to the branch ducts. For removing the flat end face 30 of projection 26 from the mold, in the mold part 34 a removable portion may be provided which is extracted for example downwards after removal of the other mold part 32, or which is extracted parallel to the axis of the branch duct 18, or else a rectangular projection formed on the mold part 32.

In the perspective view of FIG. 2, the trace 42 of the first joint plane 36 can be seen as well as the trace 44 of the third joint plane 40.

In FIG. 4, a variant of construction of the invention has been shown in which each main duct 12, 14 is connected to a first branch duct 16, 18 respectively, as in the embodiment of FIGS. 1 to 3, and also to a second branch duct 46, 48 respectively.

In this variant, the branch ducts 16, 46 of the main duct 12 are axially aligned and the branch ducts 18, 48 of the other main duct 14 are also axially aligned. The result is that the joining and connecting block 50 of the invention has a shape which is derived from that of FIG. 1 by a complement of symmetry with respect to the center of block 10. In other words, projection 52 associated with the branch duct 46 has exactly the shape of the projection 26 associated with duct 18, but is formed on the other flat face of body 50 while being turned around with respect to projection 26. Similarly, projection 54 associated with the branch duct 48 has exactly the shape of the projection 24 associated with duct 16 and is axially aligned with the branch duct 18.

In the examples shown in the drawings, the axes of the connecting projections 24, 26, 52, 54 formed on blocks 10, 50 are perpendicular to the axes of the main ducts 12, 14. They could also be oblique with respect to the axes of the main ducts, for example for reasons of space in the engine compartment of a motor vehicle.

What is claimed is:

1. A joining a connecting block for flexible, elastomeric ducts comprising at least two main ducts and two branch ducts, each branch duct having an end connected to a corresponding main duct within the block, said block being made from an elastomer material molded as a single piece about the main ducts and the connected ends of the branch ducts, and wherein the main ducts extend substantially parallel to each other within the block forming parallel axes in the joining block, and wherein the ends of the branch ducts connected to the main ducts extend obliquely with respect to the plane defined by the axes of the main ducts.

2. The joining and connecting block as claimed in claim 1, wherein he ends of the branch ducts extend on the same side of the plane defined by the axes of the main ducts within said block and are offset with respect to each other.

3. The joining and connecting block as claimed in claim 1, wherein the ends of the branch ducts are parallel to each other.

4. The joining and connecting block as claimed in claim 1, wherein the end of at least one branch duct forms an angle of at least 90° with a plane tangential to the peripheries of the main ducts and extends form one side of a main duct to the opposite side of the other main duct, the plane corresponding to a joining surface between mold parts used for manufacturing said block.

5. The joining and connecting block as claimed in claim 1, wherein each main duct is connected to two branch ducts.

6. The joining and connecting block as claimed in claim 5, wherein the branch ducts connected to the same main duct are axially aligned.

7. The joining and connecting block as claimed in claim 1, comprising elastomer material reinforcement projections which are molded around the connections of the branch ducts to the main ducts.

* * * * *